United States Patent
Forsberg et al.

(10) Patent No.: US 6,513,445 B1
(45) Date of Patent: Feb. 4, 2003

(54) PLANT AND GRATE BLOCK FOR THE THERMAL TREATMENT OF WASTE MATERIALS

(75) Inventors: Stefan Forsberg, Tomelilla (SE); Klaus Zoss, Uster (SE)

(73) Assignee: Von Roll Umwelttechnik AG, Zurich (CH)

( * ) Notice: Subject to any disclaimer, the term of this patent is extended or adjusted under 35 U.S.C. 154(b) by 96 days.

(21) Appl. No.: 09/641,118

(22) Filed: Aug. 17, 2000

(30) Foreign Application Priority Data

Aug. 20, 1999 (CH) ................................ 1525/99

(51) Int. Cl.⁷ ............................. F23H 3/00; F23H 1/02
(52) U.S. Cl. ..................... 110/298; 110/299; 110/300; 126/175 R; 126/163 R
(58) Field of Search ................. 110/298, 299, 110/300, 327, 346, 348; 126/152 B, 174, 175, 152 R, 163 R; 239/548

(56) References Cited

U.S. PATENT DOCUMENTS

| | | | | |
|---|---|---|---|---|
| 2,569,639 A | * | 10/1951 | Martin | 110/30 |
| 4,463,688 A | * | 8/1984 | Andreoli | 110/298 |
| 4,510,873 A | * | 4/1985 | Shigaki | 110/289 |
| 4,870,913 A | * | 10/1989 | Schneider | 110/299 |
| 4,876,972 A | * | 10/1989 | Mrklas | 110/298 |
| 5,245,983 A | * | 9/1993 | Krieger | 126/163 R |
| 5,322,434 A | * | 6/1994 | Milewski et al. | 432/78 |
| 5,405,537 A | * | 4/1995 | Goff et al. | 210/739 |
| 5,588,829 A | * | 12/1996 | Stahl et al. | 432/77 |
| 5,617,801 A | * | 4/1997 | Hauser et al. | 110/282 |
| 5,680,824 A | | 10/1997 | Kemter et al. | |
| 5,749,309 A | * | 5/1998 | Forsberg et al. | 110/346 |
| 5,762,008 A | * | 6/1998 | Martin et al. | 110/345 |
| 5,775,238 A | * | 7/1998 | Hauser | 110/282 |
| 5,983,811 A | | 11/1999 | Keldenich et al. | |
| 6,067,916 A | * | 5/2000 | Martin et al. | 110/348 |
| 6,145,451 A | * | 11/2000 | Zuri et al. | 110/298 |

FOREIGN PATENT DOCUMENTS

| | | |
|---|---|---|
| DE | 40 27 908 A1 | 3/1992 |
| DE | 195 02 261 | 8/1995 |
| DE | 196 50 119 C1 | 2/1998 |
| DE | 197 36 003 | 2/1998 |
| EP | 621 448 A1 | 10/1994 |

* cited by examiner

*Primary Examiner*—Ira S. Lazarus
*Assistant Examiner*—K. B. Rinehart
(74) *Attorney, Agent, or Firm*—Cohen, Pontani, Lieberman & Pavane

(57) ABSTRACT

A plant for the thermal treatment of waste materials. The plant has a grate, on the surface of which the waste materials lie. The grate has gas passages which are connected to a gas supply for the grate surface. The gas supply has at least one oxygen feed system, the discharge openings of which are arranged at the end faces in cooled grate blocks.

17 Claims, 5 Drawing Sheets

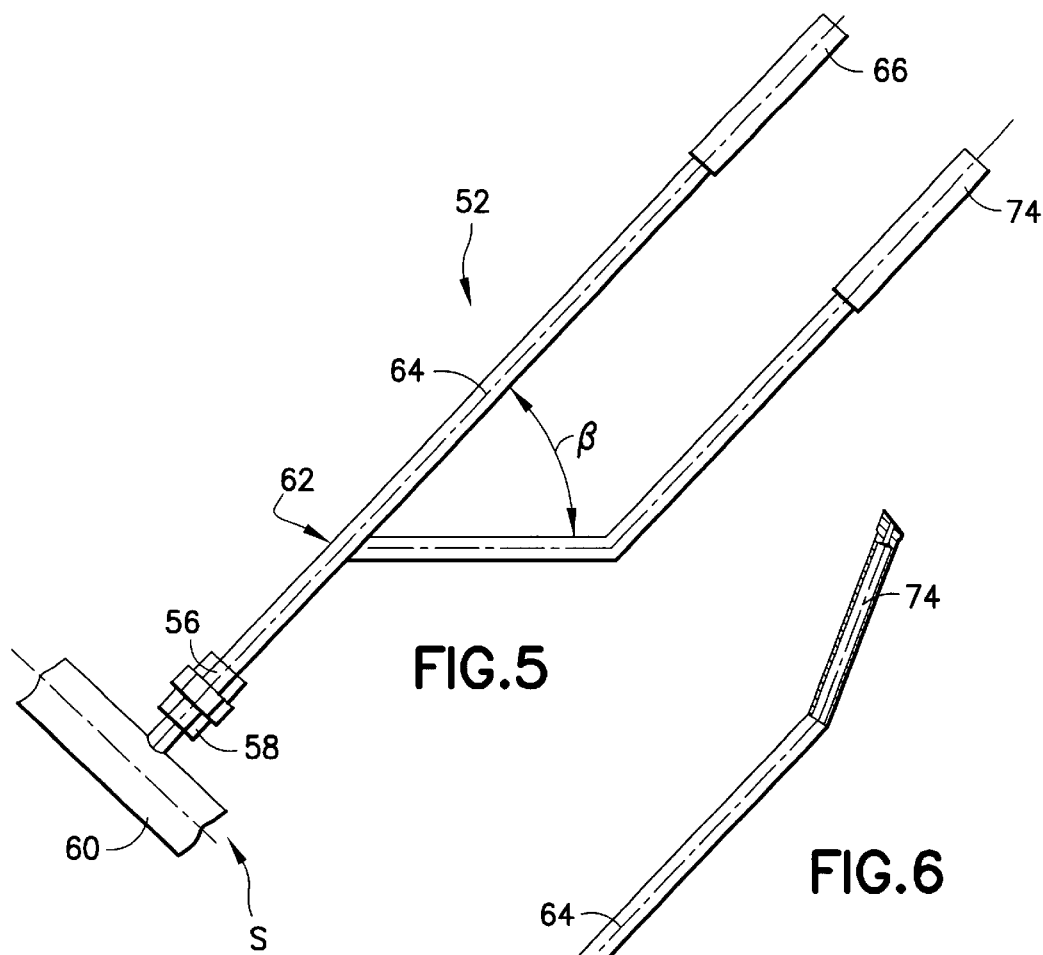
FIG.5
FIG.6
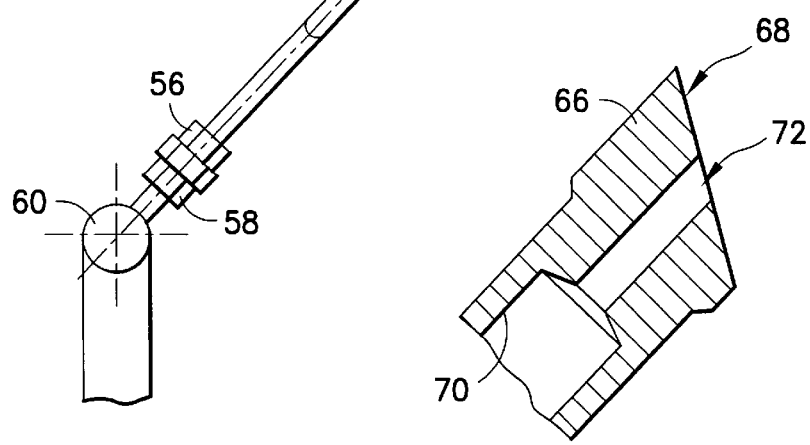
FIG.7

PLANT AND GRATE BLOCK FOR THE THERMAL TREATMENT OF WASTE MATERIALS

BACKGROUND OF THE INVENTION

1. Field of the Invention

The invention relates to a plant for the thermal treatment of waste materials, having a grate which is formed by grate blocks and on the surface of which the waste materials lie for the thermal treatment, the grate having gas passages which are connected to a gas supply for the grate surface. Furthermore, the invention relates to a grate block for such a plant.

2. Discussion of the Prior Art

A plant of the type mentioned at the beginning has been disclosed, for example, by DE 40 27 908 A1, DE 196 50 119 C1 or EP 0 621 448 B1. In this known plant, in which waste materials in particular are incinerated, oxygen is added to the primary air flowing into the undergrate chamber in order to obtain as far as possible low-pollution combustion of the fuels. Furthermore, on account of the oxygen requirement of different magnitude in various regions of the grate, it is known to vary the oxygen content of the primary air.

In order to distribute the oxygen to the grate in accordance with the oxygen-requirement profile, an appropriate number of undergrate chambers, into which primary air of different oxygen content flows, are provided in the known incineration plant. So that the desired oxygen profile is retained, however, mixing of the primary air enriched with oxygen must be prevented during the discharge from the various undergrate chambers. Furthermore, the primary air must not be enriched too highly with oxygen, since otherwise combustion residues, also called riddlings, falling into the undergrate chamber, are undesirably ignited. At the same time, an adequate volumetric flow of primary air must flow into the undergrate chamber so that, on the one hand, the grate is cooled and, on the other hand, the risk of combustible gases diffusing back from the combustion space into the undergrate chamber at a primary-air volumetric flow which is too low is removed, these gases forming an explosive mixture with the added oxygen in the undergrate chamber.

SUMMARY OF THE INVENTION

Based on this prior art, the object of the invention is to provide a plant for the thermal treatment of waste materials, or a grate block for a plant, which permits a specific oxygen feed and does not have the disadvantages of the known plants.

Various advantages are obtained by the feeding of oxygen without mixing with the undergrate directly at the location where oxygen is required at the grate surface. Thus, the restrictions for the incineration plant due to the restricted number of undergrate chambers do not apply. The latter no longer need to be sealed off from one another if locally different oxygen concentrations are desired. The ignition of riddlings is avoided, since there is only air in the undergrate chamber. The plant may therefore be run with a smaller undergrate volume. Since, according to the invention, pure oxygen can be fed, both combustion and degassing can be carried out at a higher temperature.

In the invention, only primary air flows through the undergrate chamber, whereas the additional oxygen necessary for low-pollution combustion is not fed until the point of action, at the end face, in the immediate vicinity of the grate surface on which the combustion or degassing of waste materials takes place. As a result, it is possible to specifically set the oxygen content of the combustion air in accordance with the respective requirement. Furthermore, it is no longer necessary to design different undergrate chambers which are intended to influence the oxygen content of the combustion air in known incineration plants, as a result of which corresponding supply arrangements for the primary air are also dispensed with, so that the requisite technical outlay in the case of the incineration plant according to the invention is lower compared with known combustion plants.

Thus, it is proposed to define a plurality of successive regions with in each case at least one discharge opening in a predetermined direction on the grate, in which case the volumetric oxygen flow discharging from the discharge opening of each region can be regulated. Due to this subdivision of the grate into various regions and the specific regulation of the volumetric oxygen flow, very accurate setting of the oxygen content of the combustion air is possible, as a result of which the amount of oxygen fed can be optimized at any point. In this embodiment of the plant according to the invention, it is especially advantageous if the discharge openings formed in one region are connected to a common section of the oxygen feed system for the gas supply.

A plurality of nozzles, which have the discharge openings for the oxygen to be fed, are preferably connected to the end of the oxygen feed system of the gas supply. At the same time, it is especially advantageous if, at an incineration grate, in each case at least one nozzle is assigned to at least one of the primary-air passages, so that oxygen can be specifically fed to the primary air flowing through this primary-air passage. In particular, it is of advantage if the nozzle is in arranged and held in the primary-air passage. In this way, the nozzle, which heats up during the combustion of the fuels, is cooled by the primary air flowing into the primary-air passage. This effect is intensified if the nozzle is held in the primary-air passage in a heat-conducting manner, so that the heat quantity stored in the nozzle can be rapidly dissipated to the grate.

Furthermore, it is of advantage if the nozzle is designed in such a way that the oxygen discharging from the nozzle discharges approximately at sound velocity. In this way, obstructions of the nozzle are avoided on the one hand, and the nozzle is additionally cooled by the oxygen due to its high flow velocity on the other hand.

In a preferred embodiment of the plant, the oxygen feed system of the gas supply can be additionally connected to a second gas supply, by means of which a gas which is more inert compared with oxygen can be fed to the discharge openings. By means of this second gas supply, flow (also) occurs through the nozzles, if no $O_2$ is fed, in order to avoid obstructions.

Furthermore, it is also proposed to provide a further oxygen supply for the oxygen enrichment of the primary air during the combustion in order to ensure a sufficient oxygen content of the combustion air.

In a further preferred embodiment of the plant according to the invention for the incineration of waste materials, at least one grate element, which is formed from a plurality of grate blocks arranged side by side in a predetermined direction and provided in each case with at least one primary-air passage, is assigned to each undergrate chamber. In this case, at least one of the discharge openings is provided on every grate block of a predetermined number of grate blocks, for example on every second grate block. If two or more grate elements are formed in an incineration plant, it is especially advantageous if the zones are provided with grate blocks of a identical design, the discharge openings of in each case grate blocks arranged side by side transversely to the predetermined direction being connected to a common section of the feed system of the gas supply. In this way, the elements arranged side by side can be subdivided in the predetermined direction into various regions which are supplied with different oxygen quantities by the various sections of the oxygen feed system.

Since the waste materials, in the plant according to the invention, are fed continuously, they are also conveyed continuously forward and are incinerated or degassed in the process. On account of the decreasing oxygen requirement toward the end of the grate, the oxygen supply as viewed in the transport direction of the waste materials is specifically reduced in accordance with the requirement.

To transport the waste materials, grate blocks of the grate are arranged so as to be staggered one behind the other and inclined at an angle in the predetermined transport direction, the grate blocks forming bearing edges, running transversely to the predetermined transport direction, for the fuels. Some of the grate blocks are mounted so as to be movable between an initial position and a lifting position. The fuel is transported continuously along the grate surface by the movement of the grate blocks. The discharge openings for oxygen according to the invention are preferably provided on the fixed grate blocks, since a complicated feed system, which otherwise would have to permit the movement of the grate blocks, can be dispensed with.

The grate blocks of the plant according to the invention are cooled in order to prevent premature aging due to high temperatures caused by the use of oxygen.

The various features of novelty which characterize the invention are pointed out with particularity in the claims annexed to and forming a part of the disclosure. For a better understanding of the invention, its operating advantages, and specific objects attained by its use, reference should be had to the drawing and descriptive matter in which there are illustrated and described preferred embodiments of the invention.

BRIEF DESCRIPTION OF THE DRAWINGS

FIG. 5 shows a partly sectioned plan view of a pipeline fork, used in the grate block according to FIG. 4, for the oxygen supply;

FIG. 6 shows a side view of the pipeline fork according to FIG. 5; and

FIG. 7 shows an enlarged detail of a nozzle of the pipeline fork according to FIG. 5.

DETAILED DESCRIPTION OF THE PREFERRED EMBODIMENTS

Figure 1:
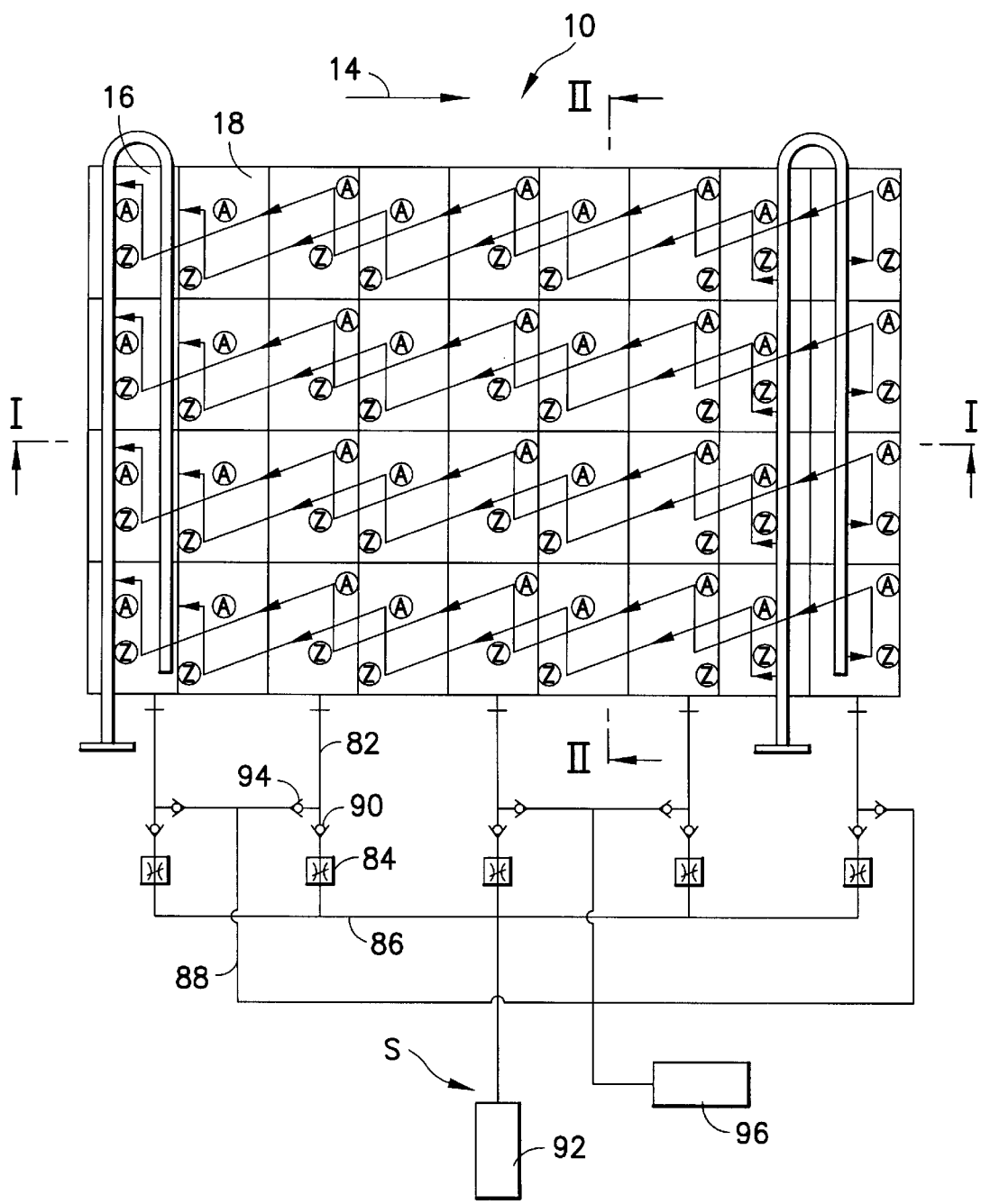
FIG. 1 shows a plan view of a grate element of a plant according to the invention in schematic representation.

FIG. 1 shows a plan view of a grate element 10 which is arranged in a plant for the thermal treatment of garbage (not shown).

The grate element 10 is formed from up to 6×8 grate blocks 16, 18. A grate has up to six zones 12 with up to four grate elements 10 each arranged in parallel. The waste materials are delivered onto that region of the grate element 10 which is shown on the left in FIG. 1 and are conveyed continuously in the transport direction 14 and incinerated or degassed in the process.

Figure 2:
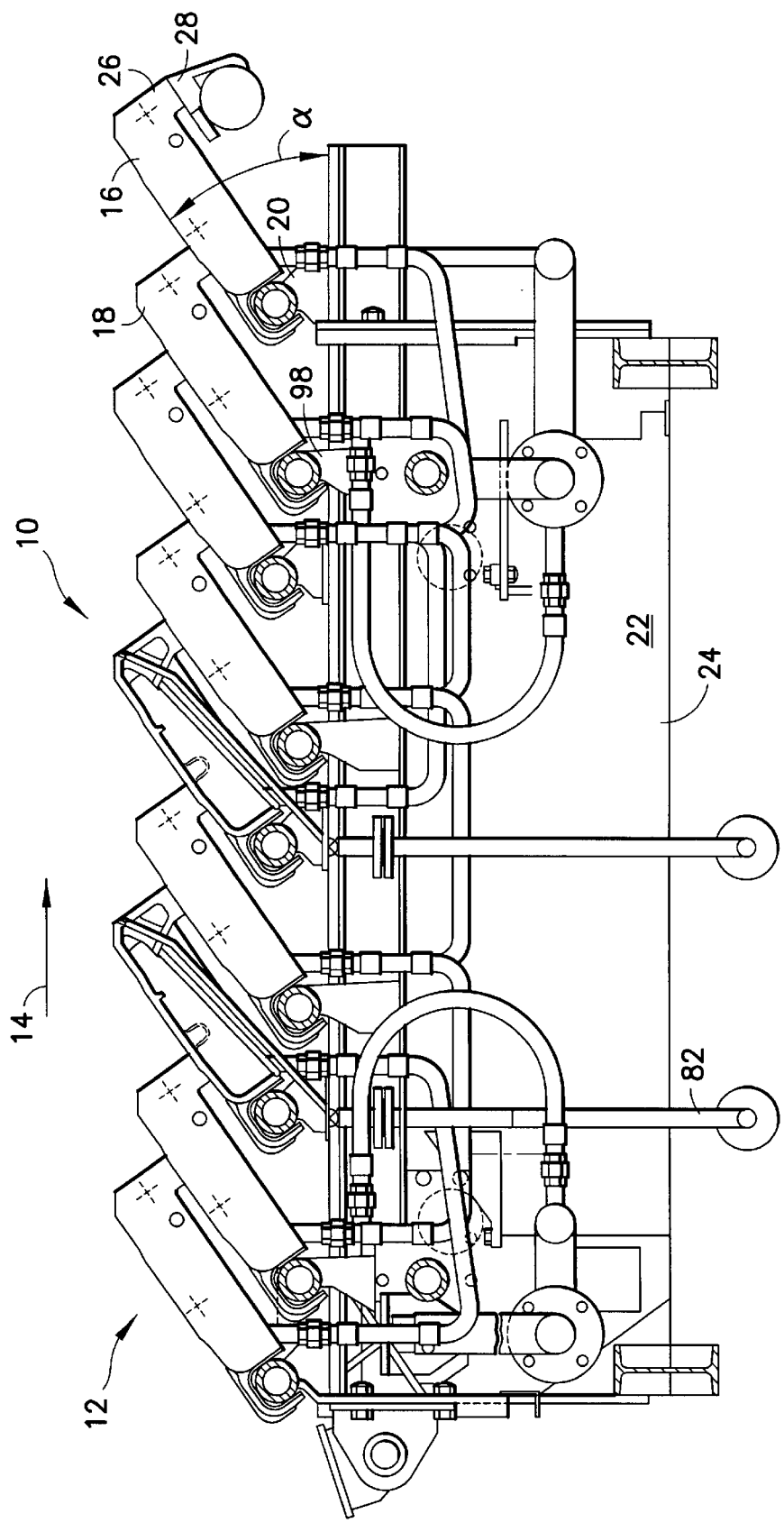
FIG. 2 shows a sectional view of the grate element along section line I—I in FIG. 1.

As shown in FIG. 2, the grate blocks 16 and 18, as viewed in the transport direction 14, are arranged so as to be inclined at an angle a to the horizontal, i.e. to the transport surface of the grate. The fixed grate blocks 16 are each pivotably mounted on a bearing bracket 20, here on the housing 22 of an undergrate chamber 24. In this case, the last fixed grate block 16, as viewed in the transport direction 14, of the last grate element of the grate in transport direction 14, the grate block 16 being shown on the right in FIG. 2, is supported by means of a prominence 26, formed on its underside, on a fixed bearing 28.

Figure 4:
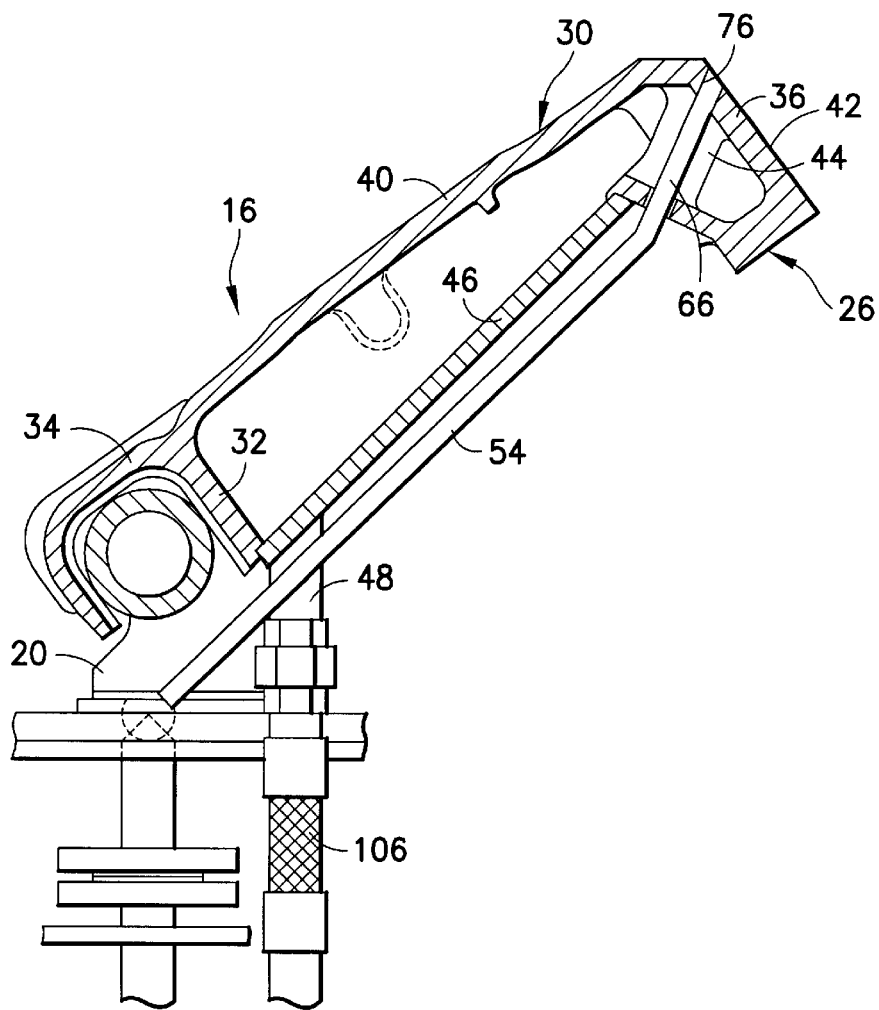
FIG. 4 shows an enlarged, sectioned side view of a grate block according to the invention.

As shown in FIG. 4, in which one of the fixed grate blocks 16 is shown in an enlarged sectional view, the grate block 16 has a first essentially L-shaped profile section 30, with a first leg 32, and an adjoining second L-shaped profile section 34, with which the grate block 16 is pivotably mounted on the bearing bracket 20. The U-shaped profile 36 shown on the right in FIG. 4 forms the front plate 42 of the grate block 16. Arranged between the first L-shaped profile 30 and the U-shaped profile 36 are a plurality of sleeve-shaped passages 44, of which only one can be seen in FIG. 4. The sleeve-shaped passages 44 may serve as a duct for primary air passages, which are formed on the grate block 16 and through which primary air flowing into the undergrate chamber 24 is fed to the furnace. The profile section 30 together with a plate 46 forms a closed-off cavity in which the water cooling (not shown) is arranged. Water-cooled grate blocks of this type are described in EP-A-0 713 056 and EP-A-0 743 488.

Figure 3:
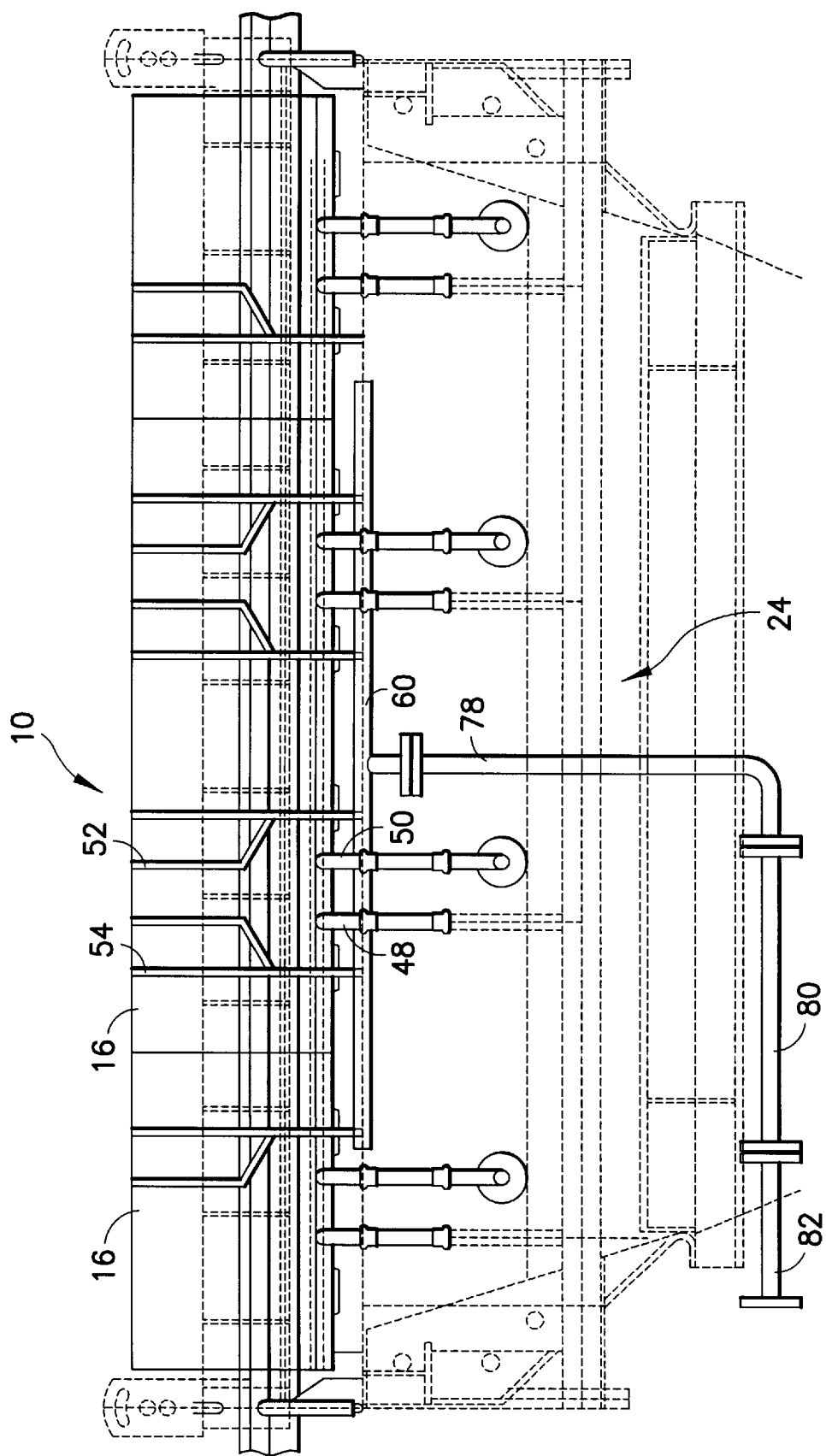
FIG. 3 shows a sectional view of the grate element along section line II—II in FIG. 1.

As shown in FIG. 3, in which four fixed grate blocks 16 are arranged side by side, each grate block 16 has two connection pieces 48 and 50, which are connected to the cavity formed in the first profile section 30. That connection piece 48 of each grate block 16 which is shown on the left in each case in FIG. 3 serves as a connection for a cooling-water inlet. The connection piece 50 shown on the right in each case serves as a cooling-water outlet for the cooling water flowing in through the connection piece 48. As FIG. 3 also shows, in each case two pipeline forks 52 and 54 are fastened to the two center grate blocks 16, whereas in each case only one pipeline fork 52 or 54 is provided at the two outer grate blocks 16. The two pipeline forks 52 and 54 are designed in mirror symmetry, so that the description can be restricted to the pipeline fork 52.

FIG. 5 shows a part of the oxygen feed system S with a pipeline fork 52, on whose end shown at the bottom a pipe coupling 56 is provided. The pipe coupling 56 is screwed gastight to a pipe socket 58, which projects from a supply line 60 fastened transversely to the transport direction 14 under the grate blocks 16 in the housing 22 of the undergrate chamber 24.

Adjoining the pipe coupling 56 is a fork 62, which has a straight pipe section and a second pipe section running obliquely at an angle $\beta$ to the longitudinal direction of the straight pipe section. Inserted into the straight pipe section is a conduit 64, which runs in the longitudinal direction of the straight pipe section and to the end of which a nozzle 66 is fastened. The nozzle 66 likewise runs in the longitudinal direction of the conduit 64, but is inclined relative to the plane spread out by the fork 62, as FIG. 6 shows.

The second pipe section is bent to about half the length of the pipeline fork 52 in such a way that its end section runs parallel to the conduit 64. Here, too, a nozzle 74 of identical design to the nozzle 66 is fastened to the end of the second pipe section.

An enlarged representation of the nozzle 66 is shown in FIG. 7. The nozzle 66 is beveled at its end face 68 and has a stepped through-hole 70, which is connected to the conduit 64 and whose section of smaller diameter ends in a discharge opening 72 formed at the end face 68 of the nozzle 66. The reduction in the cross section of flow in the through-hole 70 of the nozzle 66 achieves the effect that, at an appropriate line pressure in the conduit 64, the gas flowing through the through-hole 70 flows approximately at sound velocity from the discharge opening 72.

Figure 4A:
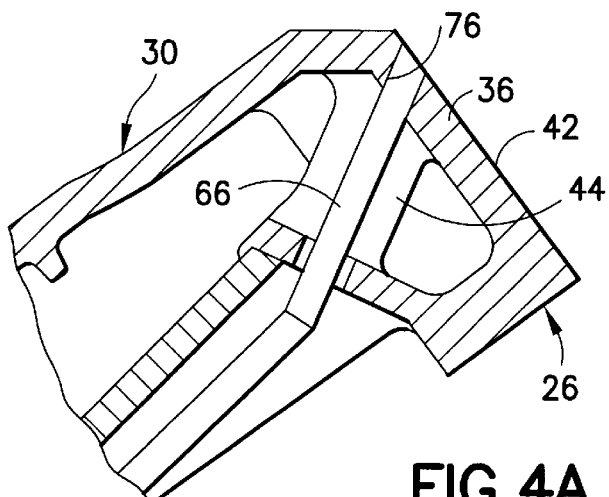
FIG. 4A shows an enlarged portion of FIG. 4.

As FIG. 4A shows, a passage 76, into which the nozzle 66 or 74 respectively is inserted, is formed in the second leg 36 at the transition between the base 40 of the U-shaped profile section and the second leg 36. In another embodiment, for the passage 76, there may be a plurality of openings for the primary-air passage. Instead of the line system described, ducts formed in the grate block 16 may also serve as oxygen feed, these ducts being connected, for example, by lines to a gas supply. The nozzles 66, 74 may in each case also be held in a primary-air passage.

As also shown in FIG. 3, the supply line 60 is flanged to a bent intermediate pipe length 78, which in turn is connected by a straight intermediate pipe length 80 to a flange piece 82 projecting from the undergrate chamber 24. In a corresponding manner, an identical supply line 60 is formed for every further row of fixed grate blocks 16. As FIG. 1 shows, the flange piece 82 of each supply line 60 of each row of grate blocks 16 is in turn connected to a check valve 90 and a choke valve 84. The choke valves 84 are in turn connected via a line 86 to an oxygen source 92. The check valves 90 or the check valves 94 prevent nitrogen or oxygen from flowing into the oxygen line 86 or into the nitrogen line 88 respectively.

Since each row of fixed grate blocks 16, which are arranged side by side transversely to the transport direction 14, is connected to a common supply line 60, the oxygen content in the combustion air in the region of this row of grate blocks 16 can be specifically set by appropriate automatic setting of the volumetric oxygen flow by means of the choke valves 84 assigned to each supply line 60.

At low oxygen pressure, nitrogen flows out of the nitrogen source 96 at high pressure into the supply lines 60 in order to prevent obstruction of the nozzles 66 or 74. Instead of nitrogen, another gas which is more inert compared with oxygen may also be used. On the other hand, to keep the nozzles 66 and 74 clear, appropriately compressed air from the surroundings is also suitable.

Furthermore, the arrangement of the nozzles 66 and 74 in the primary—air passages achieves a situation in which the nozzles 66 and 74 of the pipeline forks 52 and 54 for the oxygen supply can be continuously cooled. The grate blocks 16 and 18 are cooled by the cooling—water system which includes a hose 106 and a fitting 48 (as disclosed by the prior art).

The invention is not limited by the embodiments described above which are presented as examples only but can be modified in various ways within the scope of protection defined by the appended patent claims.

We claim:

1. A plant for thermal treatment of waste materials, comprising: a grate formed by cooled grate blocks and on a surface of which grate the waste materials lie for the thermal treatment, the grate having gas passages and at least one primary-air passage separate from the gas passages; and a gas supply connected to the gas passages so as to supply gas to the grate surface, the gas supply having at least one oxygen feed system with discharge openings arranged at end faces in the cooled grate blocks so that oxygen and primary air are isolated from one another and supplied separately to the grate surface.

2. A plant as defined in claim 1, wherein a plurality of successive regions with in each case at least one of the discharge openings are defined on the grate in a predetermined direction, volumetric oxygen flow discharging from the discharge opening of each region being regulatable.

3. A plant as defined in claim 2, wherein at least one row of several discharge openings is formed side by side transversely to the predetermined direction in each region, in each case the discharge openings of one of the regions being connected to a common section of the oxygen feed system.

4. A plant as defined in claim 1, wherein the oxygen feed system has at least one nozzle which is assigned to a primary-air passage and on which the discharge opening is provided.

5. A plant as defined in claim 4, wherein the nozzle is arranged in the primary-air passage.

6. A plant as defined in claim 5, wherein the nozzle is held in the primary-air passage in a heat-conducting manner.

7. A plant as defined in claim 4, wherein the nozzle has a through-hole which is stepped so that volumetric gas flow discharging from the nozzle reaches at least approximately sound velocity.

8. A plant as defined in claim 1, and further comprising a second gas supply containing a gas more inert than oxygen, the oxygen feed system being connectable to the second gas supply so that a gas which is more inert compared with oxygen can be directed into the oxygen feed system in order to keep the discharge openings of the nozzles clear.

9. A plant as defined in claim 8, wherein in each case a check valve is arranged both in a feed line of the oxygen feed system and in a feed line of the gas supply.

10. A plant as defined in claim 1, and further comprising a housing defining an undergrate chamber, the grate including at least one grate element, which is formed from a plurality of the grate blocks arranged side by side in a predetermined direction, is assigned to the undergrate chamber, at least one of the discharge openings being provided on every grate block of a predetermined number of the grate blocks.

11. A plant as defined in claim 10, wherein at least one of the discharge openings is provided on every second grate block.

12. A plant as defined in claim 10, wherein the discharge openings provided in each case on common grate block are connected to a common section of the oxygen feed system of the gas supply.

13. A plant as defined in claim 10, wherein at least two rows of grate blocks are provided with grate blocks of identical design, the discharge openings of in each case grate Ad blocks arranged side by side transversely to the predetermined direction being connected to a common section of the oxygen feed system of the gas supply.

14. A plant as defined in claim 1, having movable and fixed grate blocks, wherein the fixed grate blocks are provided with the discharge openings.

15. A grate block for a plant having a grate formed by cooled grate blocks and on a surface of which grate the waste materials lie for the thermal treatment, the grate having gas passages, and a gas supply connected to the gas passages so as to supply gas to the grate surface, the gas supply having at least one oxygen feed system with discharge openings arranged at end faces in the cooled grate blocks, the grate block comprising at least one sleeve-shaped primary air passage; and at least one nozzle, on which the discharge opening for the oxygen to be fed is formed, held in the passage so that oxygen and primary air are isolated from one another and supplied separately to the grate surface.

16. A grate block as defined in claim 15, wherein the nozzle is connected to a line which is passed through the grate block and is connectable to the gas supply of the plant.

17. A grate block as defined in claim 17, wherein at least one further primary-air passage is provided, in which a further nozzle for the oxygen feed is formed, the line of the first nozzle having a branch connected to the further nozzle.

\* \* \* \* \*